(12) United States Patent
Choi et al.

(10) Patent No.: US 7,894,275 B2
(45) Date of Patent: Feb. 22, 2011

(54) METHODS OF COMMUNICATING DATA USING INVERSION AND RELATED SYSTEMS

(75) Inventors: Jung-yong Choi, Gyeonggi-do (KR); Dong-woo Lee, Gyeonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 784 days.

(21) Appl. No.: 11/818,165

(22) Filed: Jun. 13, 2007

(65) Prior Publication Data
US 2008/0162778 A1  Jul. 3, 2008

(30) Foreign Application Priority Data
Aug. 14, 2006  (KR)  ...................... 10-2006-0076726

(51) Int. Cl.
*G11C 7/10*  (2006.01)
(52) U.S. Cl. .................. 365/189.05; 365/191; 365/198; 710/100
(58) Field of Classification Search ............ 365/189.05, 365/191, 198; 710/100, 305
See application file for complete search history.

(56) References Cited

U.S. PATENT DOCUMENTS

| | | | | | |
|---|---|---|---|---|---|
| 5,630,106 | A | * | 5/1997 | Ishibashi | ..................... 345/533 |
| 6,046,943 | A | * | 4/2000 | Walker | .................. 365/189.05 |
| 6,633,951 | B2 | * | 10/2003 | Cohen | ........................ 711/105 |
| 6,721,194 | B2 | * | 4/2004 | Sekiguchi et al. | ........... 711/105 |
| 6,788,106 | B2 | * | 9/2004 | Kwak et al. | ................... 326/52 |
| 6,918,002 | B2 | * | 7/2005 | Kumaki et al. | .............. 711/104 |
| 6,999,371 | B2 | * | 2/2006 | Nii | .............................. 365/227 |
| 7,142,021 | B2 | * | 11/2006 | Park | ........................... 326/104 |
| 7,327,356 | B2 | * | 2/2008 | Yusa | .......................... 345/204 |

FOREIGN PATENT DOCUMENTS

| KR | 1020050012137 | 1/2005 |
|---|---|---|
| KR | 1020050058914 | 6/2005 |
| KR | 1020050058915 | 6/2005 |

* cited by examiner

*Primary Examiner*—Dang T Nguyen
*Assistant Examiner*—Alexander Sofocleous
(74) *Attorney, Agent, or Firm*—Myers Bigel Sibley & Sajovec

(57) ABSTRACT

A method may be provided to communicate a plurality of groups of output data bits representing a respective plurality of groups of input data bits over a data bus with each group of output data bits and each group of input data bits have an equal data width. Each of the plurality of groups of input data bits at may be received at a data register. For each group of input data bits received at the data register, if a number of data bits of the group of input data bits having a first logic level is greater than half of the data width, the group of input data bits are inverted, the inverted group of input data bits are transmitted as a respective group of output data bits in parallel over the data bus, and an inversion flag associated with the respective group of output data bits is transmitted. For each group of input data bits received at the data register, if a number of data bits of the group of input data bits having a second logic level different than the first logic level is greater than half of the data width, the group of input data bits is transmitted without inversion as a respective group of output data bits in parallel over the data bus, and a non-inversion flag associated with the respective group of output data bits is transmitted. Related systems are also discussed.

24 Claims, 11 Drawing Sheets

FIG. 2

| Frequency[MHz] | | 533 | 400 | 333 | 266 | 200 | 166 | Note |
|---|---|---|---|---|---|---|---|---|
| Power[mW] | POD at 1.2[V] | 120 | 115 | 113 | 110 | 108 | 107 | AC+DC Power |
| | LVCMOS at 1.2[V] | 54 | 40 | 34 | 27 | 20 | 17 | AC Power |

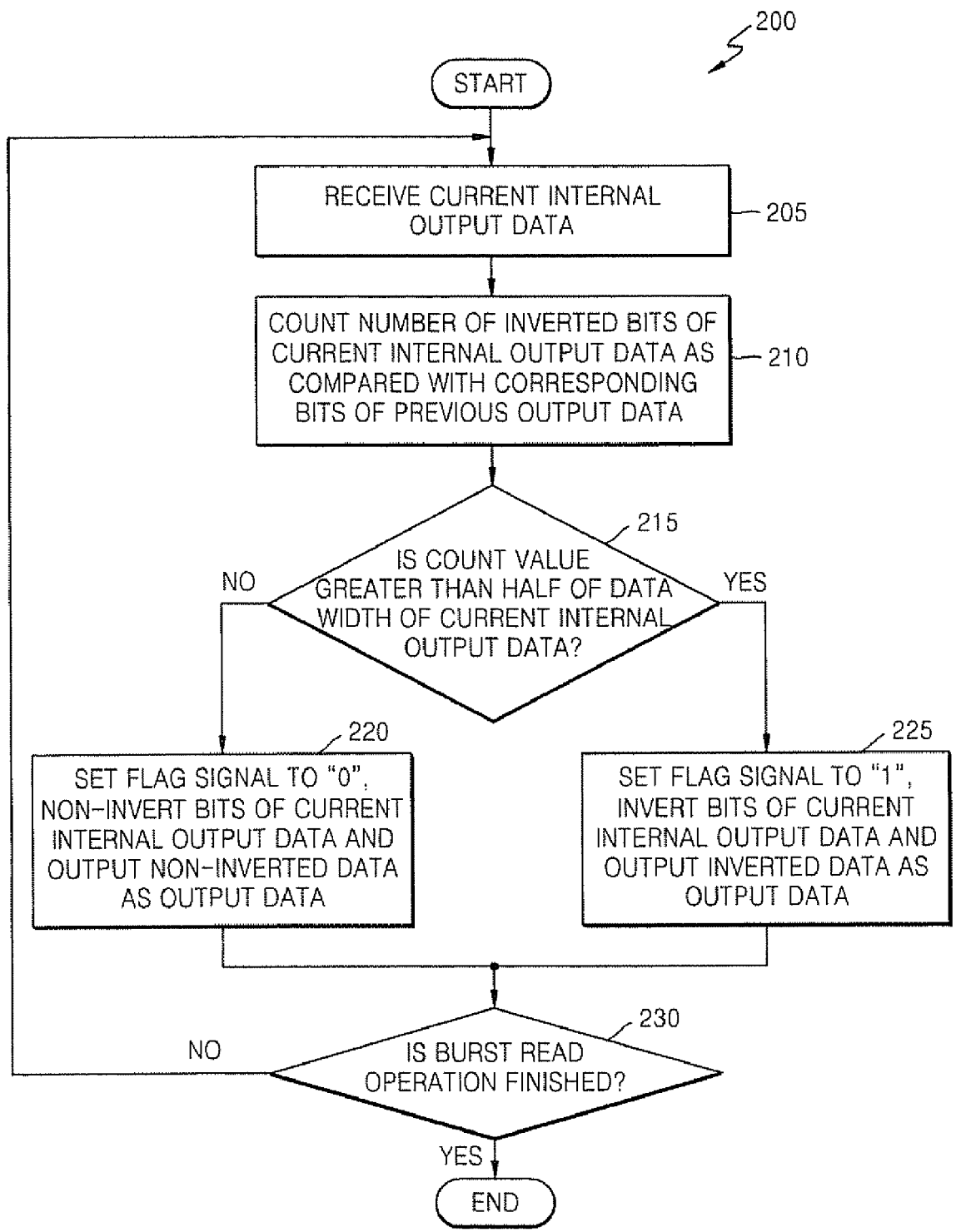

US 7,894,275 B2

METHODS OF COMMUNICATING DATA USING INVERSION AND RELATED SYSTEMS

RELATED APPLICATION

This application claims the benefit of Korean Patent Application No. 10-2006-0076726, filed on Aug. 14, 2006, in the Korean Intellectual Property Office, the disclosure of which is incorporated herein in its entirety by reference.

FIELD OF THE INVENTION

The present invention relates to electronics, and more particularly, to methods of processing data and related systems.

BACKGROUND

Methods of transmitting data between semiconductor devices through a transmission line include low voltage complimentary metal oxide semiconductor (LVCMOS) signaling and pseudo open drain (POD) signaling. FIG. 1A illustrates a memory system 10 using LVCMOS signaling. Referring to FIG. 1A, the memory system 10 includes a semiconductor memory device 11 such as a dynamic random access memory (DRAM), transmission lines 16 corresponding to data buses, and a memory controller 17.

The semiconductor memory device 11 may include a plurality of transceivers 12 and data input/output pads (or DQ pads) 15. Each of the transceivers 12 includes an output driver 13 and an input buffer 14. The memory controller 17 controls a data read operation and a data write operation of the semiconductor memory device 11. The memory controller 17 includes a plurality of transceivers 18 and DQ pads 21. Each of the transceivers 18 includes an output driver 19 and an input buffer 20.

The output driver 13 of the semiconductor memory device 11 may be an inverter type of driver including a PMOS transistor and an NMOS transistor or a buffer type of driver. The output driver 13 of the semiconductor memory device 11 drives the transmission line 16 having a characteristic impedance of 50 ohms, for example, with a power supply voltage VDDQ or a ground voltage VSSQ to transmit data to the input buffer 20 of the memory controller 17.

The output driver 19 of the memory controller 17 may be an inverter type of driver including a PMOS transistor and an NMOS transistor or a buffer type of driver. The output driver 19 of the memory controller 17 drives the transmission line 16 with the power supply voltage VDDQ or the ground voltage VSSQ to transmit data to the input buffer 14 of the semiconductor memory device 11.

In LVCMOS signaling, the voltage of the transmission line 16 varies between the power supply voltage VDDQ (a high level) and the ground voltage VSSQ (a low level). Accordingly, a data signal swing range in the transmission line 16 may be relatively large, and thus LVCMOS signaling may be used in a relatively low-frequency operation of the memory system 10. The low-frequency of the memory system 10 may be a frequency lower than about 300 MHz. When data is transmitted through the transmission line 16 according to LVCMOS signaling, there may be no direct current (DC) power component and only an alternating current (AC) power component may exist. Accordingly, LVCMOS signaling may provide relatively low power consumption.

FIG. 1B illustrates a memory system 20 using POD signaling. Referring to FIG. 1B, the memory system 20 may include a semiconductor memory device 21, transmission lines 27 corresponding to data buses, and a memory controller 28.

The semiconductor memory device 21 may be a graphic double data rate synchronous dynamic random access memory (DRAM). The semiconductor memory device 21 may include a plurality of transceivers 22 and DQ pads 26. Each of the transceivers 22 may include an output driver 23, a termination resistor RT1, a switch 24 and an input buffer 25. The termination resistor RT1 (having a terminal connected to the source of a power supply voltage VDDQ) and the switch 24 may provide an on die termination (ODT) circuit. The ODT circuit is a termination matching circuit that may reduce data distortion due to reflection of data transmitted through the transmission line 27. The ODT circuit may be activated when the switch 24 is turned on.

The memory controller 28 may control a data read operation and a data write operation of the semiconductor memory device 21. The memory controller 28 includes a plurality of transceivers 29 and DQ pads 33. Each of the transceivers 29 may include an output driver 30, a termination resistor RT2, a switch 31 and an input buffer 32. The termination resistor RT2 (having a terminal connected to the source of a power supply voltage VDDQ) and the switch 31 may provide an ODT circuit that is activated when the switch 31 is turned on.

The output driver 23 of the semiconductor memory device 21 may be an inverter type of driver including a PMOS transistor and an NMOS transistor or a buffer type of driver. The output driver 23 of the semiconductor memory device 21 may drive the transmission line 27 having a characteristic impedance of 50 ohm, for example, with the power supply voltage VDDQ or a ground voltage VSSQ to transmit data to the input buffer 32 of the memory controller 28. When data is transmitted to the input buffer 32 of the memory controller 28, the ODT circuit of the semiconductor memory device 21 may be inactivated and the ODT circuit of the memory controller 28 may be activated. Accordingly, when the NMOS transistor of the output driver 23 is turned on so that the transmission line 27 is maintained at a voltage higher than the ground voltage VSSQ (a low level), a standby current may flow through the activated ODT circuit of the memory controller 28, the transmission line 27, and the turned on NMOS transistor of the output driver 23 to generate DC power. That is, when the voltage of the transmission line 27 is low (when data on the transmission line 27 is "0"), DC power may be consumed.

The output driver 30 of the memory controller 28 may be an inverter type of driver including a PMOS transistor and an NMOS transistor or a buffer type of driver. The output driver 30 of the memory controller 28 may drive the transmission line 27 with the power supply voltage VDDQ or the ground voltage VSSQ to transmit data to the input buffer 25 of the semiconductor memory device 21. When data is transmitted to the input buffer 25 of the semiconductor memory device 21, the ODT circuit of the semiconductor memory device 21 may be activated and the ODT circuit of the memory controller 28 may be inactivated. Accordingly, when the NMOS transistor of the output driver 30 of the memory controller 28 is turned on so that the transmission line 27 is maintained at a voltage higher than the ground voltage VSSQ (a low level), a standby current may flow through the activated ODT circuit of the semiconductor memory device 21, the transmission line 27, and the turned on NMOS transistor of the output driver 30 of the memory controller 28 to consume DC power.

The voltage of the transmission line 27 may vary between the power supply voltage VDDQ (high level) and a voltage higher than the ground voltage VSSQ (low level) due to the ODT circuits of the of the semiconductor memory device 21 and the memory controller 28 in POD signaling. Thus, a data signal swing range in the transmission line 27 may be relatively small and the power supply voltage VDDQ may have relatively little overshoot and/or undershoot because of the ODT circuits of the semiconductor memory device 21 and the memory controller 28 in POD signaling. Accordingly, POD signaling may be used in a high-frequency operation of the memory system 20. The high-frequency of the memory system 20 may be a frequency greater than or equal to 300 MHz. When data is transmitted through the transmission line 27 using POD signaling, both a DC power component and an AC power component may exist, and thus POD signaling may consume relatively high power.

FIG. 2 is a table illustrating relationships between operating frequencies of the memory systems of FIGS. 1A and 1B and power consumed during LVCMOS signaling and POD signaling.

In the table of FIG. 2, AC power when data is transmitted through a single DQ pad may be calculated as follows.

$$AC\ power = VDDQ^2 * C * F$$

Here, VDDQ indicates a power supply voltage. C indicates a load capacitance at the side of the transmission line 27, viewed from an output driver of a semiconductor memory device of the memory system when data is transmitted from the semiconductor memory device to a memory controller of the memory system or a load capacitance at the side of the transmission line, viewed from an output driver of the memory controller when the data is transmitted from the memory controller to the semiconductor memory device. F indicates the operating frequency of the memory system.

In the table of FIG. 2, DC power when data is transmitted through a single DQ pad may be calculated as follows.

$$DC\ power = VDDQ^2 / (RT + Ron)$$

Here, VDDQ indicates a power supply voltage, RT indicates a termination resistance, and Ron indicates an on resistance of an NMOS transistor included in the output driver.

In FIG. 2, power is average power when data is transmitted through thirty-two DQ pads of the memory system at the power supply voltage VDDQ of 1.2V. Referring to FIG. 2, both a DC power component and an AC power component may exist in POD signaling and the DC power component may be a relatively large portion of the power consumed during POD signaling. A significant DC power component may not exist and substantially only an AC power component may exist in LVCMOS signaling.

A memory system included in a portable device such as a mobile phone may be required to consume relatively little power. Accordingly, the DC power component may be reduced in POD signaling and the AC power component may be reduced in LVCMOS signaling to decrease the power consumed by a memory system of a portable device.

Furthermore, LVCMOS signaling may be suitable for a low-frequency operation of a memory system while POD signaling may be suitable for a high-frequency operation of the memory system, as described above. Accordingly, a memory system capable of reducing power consumption and capable of being used for low-frequency and high-frequency operation may be needed.

SUMMARY

According to some embodiments of the present invention, a method may be provided to communicate a plurality of groups of output data bits representing a respective plurality of groups of input data bits over a data bus wherein each group of output data bits and each group of input data bits have an equal data width. Each of the plurality of groups of input data bits may be received at a data register. For each group of input data bits received at the data register, if a number of data bits of the group of input data bits having a first logic level is greater than half of the data width, the group of input data bits may be inverted, the inverted group of input data bits may be transmitted as a respective group of output data bits in parallel over the data bus, and an inversion flag associated with the respective group of output data bits may be transmitted. For each group of input data bits received at the data register, if a number of data bits of the group of input data bits having a second logic level different than the first logic level is greater than half of the data width, the group of input data bits may be transmitted without inversion as a respective group of output data bits in parallel over the data bus, and a non-inversion flag associated with the respective group of output data bits may be transmitted.

According to some other embodiments of the present invention, a method may be provided to communicate a plurality of groups of output data bits representing a respective plurality of groups of input data bits over a data bus wherein each group of output data bits and each group of input data bits have an equal data width. Each of the plurality of groups of input data bits may be received at a data register. For each group of input data bits received at the data register, if a number of data bits of the group of input data bits that changes with respect to respective data bits of a preceding group of output data bits is greater than half of the data width, the group of input data bits may be inverted, the inverted group of input data bits may be transmitted as a respective group of output data bits in parallel over the data bus, and an inversion flag associated with the respective group of output data bits may be transmitted. For each group of input data bits received at the data register, if a number of data bits of the group of input data bits that remains unchanged with respect to respective data bits of a preceding group of output data bits is greater than half of the data width, the group of input data bits may be transmitted without inversion as a respective group of output data bits in parallel over the data bus, and a non-inversion flag associated with the respective group of output data bits may be transmitted.

According to still other embodiments of the present invention, an electronic data system may include a data register configured to receive each of a plurality of groups of input data bits and an inversion controller coupled to the data register. For each group of input data bits received at the data register, if a number of data bits of the group of input data bits having a first logic level is greater than half of the data width the inversion controller may be configured to invert the group of input data bits to generate a respective group of output data bits. For each group of input data bits received at the data register, if a number of data bits of the group of input data bits having a second logic level different than the first logic level is greater than half of the data width, the inversion controller may be configured to generate a respective group of output data bits without inversion. An output driver may be coupled to the inversion controller with the output driver being configured to transmit each respective group of output data bits in parallel over a data bus. A flag output generator may be coupled to the inversion controller, with the flag output generator being configured to transmit an inversion flag with each group of output data bits generated by inverting the respective group of input data bits, and with the flag output generator being configured to transmit a non-inversion flag with each group of output data bits generated without inverting the respective group of input data bits.

According to yet other embodiments of the present invention, an electronic data system may include a data register configured to receive each of a plurality of groups of input data bits, and an inversion controller coupled to the data register. For each group of input data bits received at the data register, if a number of data bits of the group of input data bits that changes with respect to respective data bits of a preceding group of output data bits is greater than half of the data width, the inversion controller may be configured to invert the group of input data bits to generate a respective group of output data bits. For each group of input data bits received at the data register, if a number of data bits of the group of input data bits that remains unchanged with respect to respective data bits of a preceding group of output data bits is greater than half of the data width, the inversion controller may be configured to generate a respective group of output data bits without inversion. An output driver may be coupled to the inversion controller with the output driver being configured to transmit each respective group of output data bits in parallel over a data bus. A flag output generator may be coupled to the inversion controller, with the flag output generator being configured to transmit an inversion flag with each group of output data bits generated by inverting the respective group of input data bits, and with the flag output generator being configured to transmit a non-inversion flag with each group of output data bits generated without inverting the respective group of input data bits.

According to embodiments of the present invention, a semiconductor memory device and/or a memory controller may reduce power consumed and/or may be used for both low-frequency and high-frequency operation.

According to some embodiments of the present invention, a semiconductor memory device may include a first inversion controller generating a first inversion control signal when the operating frequency of the semiconductor memory device is less than a reference frequency. A second inversion controller may generate a second inversion control signal when the operating frequency of the semiconductor memory device is greater than or equal to the reference frequency. A data inversion/non-inversion unit may invert or non-invert bits of current internal output data continuously received from a memory cell array in response to the first inversion control signal or the second inversion control signal, respectively. The data inversion/non-inversion unit may continuously output the inverted or non-inverted data as output data. A flag output unit may generate a flag signal indicating whether the output data is inverted or not in response to the first inversion control signal or the second inversion control signal. A data output unit may drive data input/output pads using LVCMOS signaling based on the output data output from the data inversion/non-inversion unit when the operating frequency is less than the reference frequency and may drive the data input/output pads using POD signaling based on the output data output from the data inversion/non-inversion unit when the operating frequency is greater than or equal to the reference frequency. The data inversion/non-inversion unit may invert the bits of current internal output data in response to the first inversion control signal when the number of inverted bits of the current internal output data as compared with the corresponding bits of the output data immediately before the current internal output data is greater than half of the data width of the current internal output data. The data inversion/non-inversion unit may invert the bits of the current internal output data in response to the second inversion control signal when the number of "1" bits or "0" bits of the current internal output data is greater than half of the data width of the current internal output data.

The first and second inversion controllers may operate in response to a frequency information signal indicating whether the operating frequency is lower than the reference frequency or not.

According to other embodiments of the present invention, a semiconductor memory device may include first and second inversion controllers respectively generating first and second inversion control signals in response to a frequency information signal indicating operating frequency information of the semiconductor memory device. A data inversion/non-inversion unit may invert or non-invert the bits of current internal output data continuously received from a memory cell array in response to the first inversion control signal or the second inversion control signal and may continuously output the inverted or non-inverted data as output data. A flag output unit may generate a flag signal indicating whether the output data is inverted or not in response to the first inversion control signal or the second inversion control signal. A data output unit may drive data input/output pads using LVCMOS signaling corresponding to the first inversion control signal or POD signaling corresponding to the second inversion control signal based on the output data output from the data inversion/non-inversion unit in response to the frequency information signal. The first inversion control signal may control the data inversion/non-inversion unit to invert the bits of the current internal output data when the number of inverted bits of the current internal output data as compared with the corresponding bits of output data immediately before the current internal output data is greater than half of the data width of the current internal output data. The first inversion control signal may control the data inversion/non-inversion unit to non-invert the bits of the current internal output data when the number of inverted bits of the current internal output data as compared with the corresponding bits of the output data immediately before the current internal output data is less than or equal to half of the data width of the current internal output data. The second inversion control signal may control the data inversion/non-inversion unit to invert the bits of the current internal output data when the number of "1" bits or "0" bits of the current internal output data is greater than half of the data width of the current internal output data. The second inversion control signal may control the data inversion/non-inversion unit to non-invert the bits of the current internal output data when the number of "1" bits or "0" bits of the current internal output data is less than or equal to half of the data width of the current internal output data.

The frequency information signal may be provided by a memory controller through a mode register set of the semiconductor memory device or through a control pad of the semiconductor memory device. The semiconductor memory device may further include a read circuit reading a plurality of internal output data stored in the memory cell array in parallel, and the read circuit may include a data register storing the plurality of internal output data read in parallel and may continuously output the current internal output data to the data inversion/non-inversion unit.

The first inversion controller may include a switch and first and second comparators. The switch may output the current internal output data output from the data register in response to the frequency information signal. The first comparator may compare the bits of current internal output data output from the switch with the corresponding bits of output data immediately before the current internal output data, counting the number of inverted bits of the current internal output data compared to the bits of the output data immediately before the current internal output data and outputting a count value corresponding to the counting result. The second comparator may compare the count value with half of the data width of the current internal output data and may output the first inversion control signal having a first logic level, which controls the data inversion/non-inversion unit to invert the current internal output data, when the count value is greater than half of the data width of the current internal output data.

The second inversion controller may include a switch, a counter, and a comparator. The switch may output the current internal output data output from the data register in response to the frequency information signal. The counter may count the number of "1" bits of the current internal output data and may output a count value corresponding to the counting result when an output driver used for POD signaling is an inverter type of driver, and may count the number of "0" bits of the current internal output data and may output a count value corresponding to the counting result when the output driver is a buffer type of driver. The comparator may compare the count value to half of the data width of the current internal output data and may output the second inversion control signal having a first logic level, which controls the data inversion/non-inversion unit to invert the current internal output data, when the count value is greater than half of the data width of the current internal output data.

The flag output unit may include a switch and a flag buffer. The switch may output the first inversion control signal or the second inversion control signal in response to the frequency information signal. The flag buffer may output the flag signal to a flag pad in response to the first inversion control signal or the second inversion control signal output respectively from the switch.

The data output unit may include an output buffer, first and second output driver units, and a switch. The output buffer unit may buffer the output data output from the data inversion/non-inversion unit. The first output driver unit may drive the data input/output pads using LVCMOS signaling. The second output driver unit may drive the data input/output pads using POD signaling. The switch may output the output data output from the output buffer unit to the first output driver unit or the second output driver unit in response to the frequency information signal.

According to other embodiments of the present invention, a memory controller may include a first inversion control signal when the operating frequency of the memory controller is lower than a reference frequency. A second inversion controller may generate a second inversion control signal when the operating frequency is higher than or equal to the reference frequency. A data inversion/non-inversion unit may invert or non-invert the bits of current internal input data continuously received from a data register in response to the first inversion control signal or the second inversion control signal and may continuously output the inverted or non-inverted data as input data. A flag output unit may output a flag signal indicating whether the input data is inverted or not in response to the first inversion control signal or the second inversion control signal. A data output unit may drive data input/output pads connected to a semiconductor memory device using LVCMOS signaling based on the input data output from the data inversion/non-inversion unit when the operating frequency is lower than the reference frequency and may drive the data input/output pads using POD signaling based on the input data output from the data inversion/non-inversion unit when the operating frequency is higher than or equal to the reference frequency. The data inversion/non-inversion unit may invert the bits of the current internal input data in response to the first inversion control signal when the number of inverted bits of the current internal input data as compared with the corresponding bits of the input data immediately before the current internal input data is greater than half of the data width of the current internal input data. The data inversion/non-inversion unit may invert the bits of the current internal input data in response to the second inversion control signal when the number of "1" bits or "0" bits of the current internal input data is greater than half of the data width of the current internal input data.

The first and second inversion controllers may operate in response to a frequency information signal indicating whether the operating frequency is lower than the reference frequency or not.

According to other embodiments of the present invention, a memory controller may include first and second inversion controllers respectively generating first and second inversion control signals in response to a frequency information signal indicating operating frequency information of the memory controller. A data inversion/non-inversion unit may invert or non-invert the bits of current internal input data continuously received from a data register in response to the first inversion control signal or the second inversion control signal and may continuously output the inverted or non-inverted data as input data. A flag output unit may output a flag signal indicating whether the input data is inverted or not in response to the first inversion control signal or the second inversion control signal. A data output unit may drive data input/output pads connected to a semiconductor memory device using LVCMOS signaling corresponding to the first inversion control signal or POD signaling corresponding to the second inversion control signal based on the input data output from the data inversion/non-inversion unit, in response to the frequency information signal. The first inversion control signal may control the data inversion/non-inversion unit to invert the bits of the current internal input data when the number of inverted bits of the current internal input data as compared with the corresponding bits of the input data right before the current internal input data is greater than half of the data width of the current internal input data. The first inversion control signal may control the data inversion/non-inversion unit to non-invert the bits of the current internal input data when the number of inverted bits of the current internal input data as compared with the corresponding bits of the input data immediately before the current internal input data is less than or equal to half of the data width of the current internal input data. The second inversion control signal may control the data inversion/non-inversion unit to invert the bits of the current internal input data when the number of "1" bits or "0" bits of the current internal input data is greater than half of the data width of the current internal input data. The second inversion control signal may control the data inversion/non-inversion unit to non-invert the bits of the current internal input data when the number of "1" bits or "0" bits of the current internal input data is less than or equal to half of the data width of the current internal input data.

According to other embodiments of the present invention, a memory system may include a semiconductor memory device and a memory controller controlling a data read operation of the semiconductor memory device. The semiconductor memory device may perform the data read operation by inverting the bits of current internal output data continuously read from a memory cell array when the number of inverted bits of the current internal output data as compared with the corresponding bits of output data immediately before the current internal output data is greater than half of the data width of the current internal output data, outputting the inverted data as the output data, transmitting the output data to the memory controller through data buses using LVCMOS signaling and, simultaneously, transmitting a flag signal indicating inversion of the output data to the memory controller when the operating frequency of the memory system is lower than a reference frequency. The semiconductor memory device may perform the data read operation by inverting the bits of the current internal output data when the number of "1" bits or "0" bits of the current internal output data is greater than half of the data width of the current internal output data, outputting the inverted data as output data, transmitting the output data to the memory controller through data buses using POD signaling and, simultaneously, transmitting the flag signal indicating inversion of the output data to the memory controller when the operating frequency of the memory system is higher than or equal to the reference frequency.

The semiconductor memory device may operate in response to a frequency information signal indicating whether the operating frequency is lower than the reference frequency or not, and the frequency information signal may be provided by the memory controller.

According to other embodiments of the present invention, a memory system may include a semiconductor memory device and a memory controller controlling a data write operation of the semiconductor memory device. The memory controller may perform the data write operation by inverting the bits of current internal input data continuously read from a data register when the number of inverted bits of the current internal input data as compared with the corresponding bits of input data immediately before the current internal input data is greater than half of the data width of the current internal input data, outputting the inverted data as the input data, transmitting the input data to the semiconductor memory device through data buses using LVCMOS signaling and, simultaneously, transmitting a flag signal indicating inversion of the input data to the semiconductor memory device when the operating frequency of the memory system is lower than a reference frequency. The memory controller may perform the data write operation by inverting the bits of the current internal input data when the number of "1" bits or "0" bits of the current internal input data is greater than half of the data width of the current internal input data, outputting the inverted data as input data, transmitting the input data to the semiconductor memory device through the data buses using POD signaling and, simultaneously, transmitting the flag signal indicating-inversion of the input data to the semiconductor memory device when the operating frequency of the memory system is greater than or equal to the reference frequency.

The memory controller may operate in response to a frequency information signal indicating whether the operating frequency is lower than the reference frequency or not.

Memory systems according to embodiments of the present invention may selectively use LVCMOS signaling suitable for a low-frequency operation and POD signaling suitable for a high-frequency operation. Furthermore, the memory system may reduce AC power in LVCMOS signaling using a data inversion method suitable for LVCMOS signaling and may decrease DC power in POD signaling using a data inversion method suitable for POD signaling.

BRIEF DESCRIPTION OF THE DRAWINGS

The above and other features and advantages of the present invention will become more apparent by describing in detail embodiments thereof with reference to the attached drawings in which:

FIG. 2 is a table illustrating power consumed for LVCMOS signaling and power consumed for POD signaling with respect to the operating frequency of memory systems of FIGS. 1A and 1B.

FIG. 4 is a flow chart illustrating a data inversion methods for LVCMOS signaling according to some embodiments of the present invention.

DETAILED DESCRIPTION

Figure 1A:
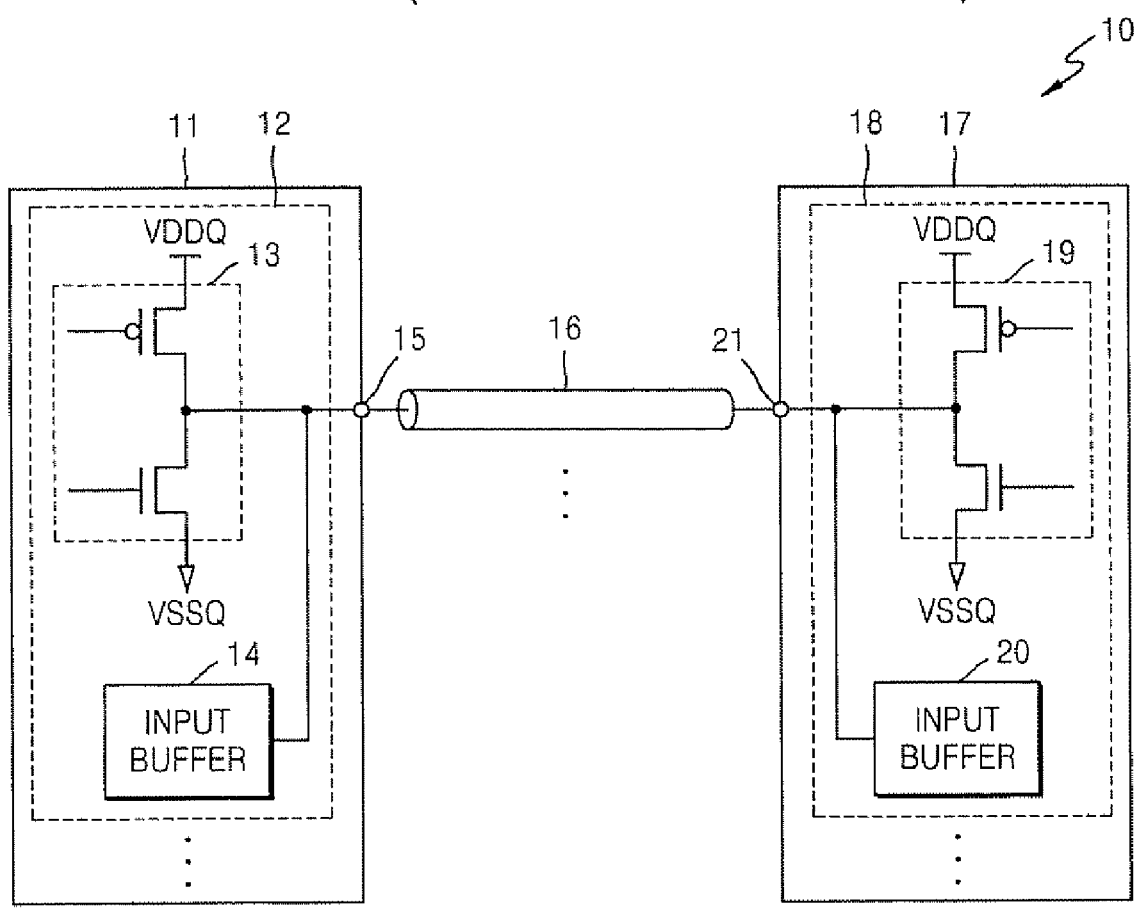
FIG. 1A illustrates a memory system using low voltage complimentary metal oxide semiconductor (LVCMOS) signaling.

The present invention is described more fully hereinafter with reference to the accompanying drawings, in which example embodiments of the invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. Moreover, each embodiment described and illustrated herein includes its complementary conductivity type embodiment as well.

It will be understood that when an element is referred to as being "connected to," "coupled to" or "responsive to" (and/or variants thereof) another element, it can be directly connected, coupled or responsive to the other element or intervening elements may be present. In contrast, when an element is referred to as being "directly connected to," "directly coupled to" or "directly responsive to" (and/or variants thereof another element, there are no intervening elements present. Like numbers refer to like elements throughout. As used herein, the term "and/or" includes any and all combinations of one or more of the associated listed items and may be abbreviated as "/".

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising" (and/or variants thereof, when used in this specification, specify the presence of stated features, integers, steps, operations, elements, and/or components, but do not preclude the presence or addition of one or more other features, integers, steps, operations, elements, components, and/or groups thereof. In contrast, the term "consisting of" (and/or variants thereof) when used in this specification, specifies the stated number of features, integers, steps, operations, elements, and/or components, and precludes additional features, integers, steps, operations, elements, and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

Figure 3:
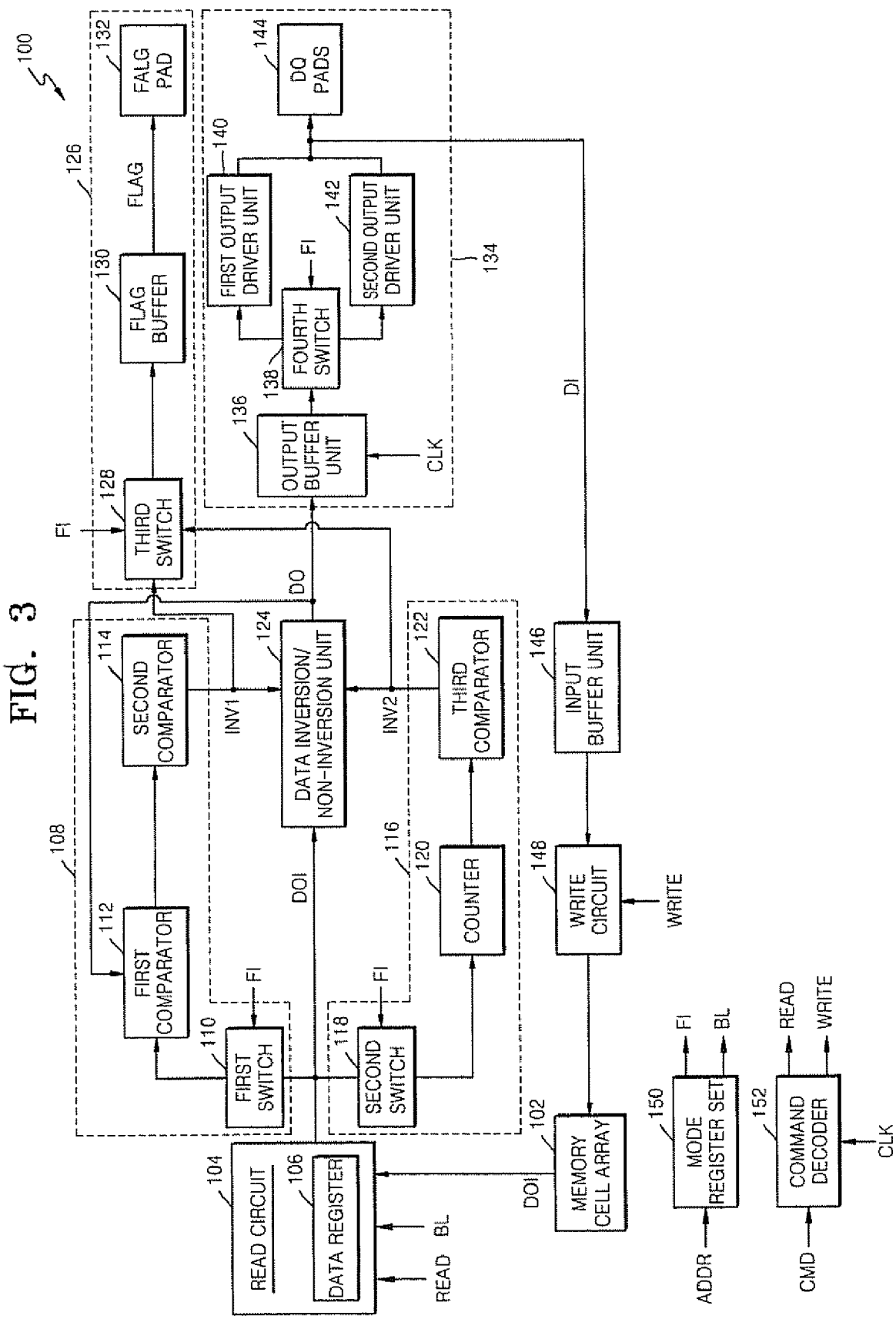
FIG. 3 is a block diagram illustrating a semiconductor memory device according to some embodiments of the present invention.

FIG. 3 is a block diagram illustrating a semiconductor memory device 100 according to some embodiments of the present invention. Referring to FIG. 3, the semiconductor memory device 100 may include a memory cell array 102, a read circuit 104, a first inversion controller 108, a second inversion controller 116, a data inversion/non-inversion unit 124, a flag output unit 126, a data output unit 134, an input buffer unit 146, a write circuit 148, a mode register set unit 150, and a command decoder 152.

The memory cell array 102 includes a plurality of memory cells storing data. The read circuit 104 includes a data register 106 and a data read operation circuit of the semiconductor memory device 100 (for example, an output sense amplifier).

The read circuit 104 may perform a burst read operation that reads a predetermined number of internal output data DOI stored in the memory cell array 102 in parallel (or simultaneously) in response to a read signal (READ) and a burst length signal (BL) and may store the internal output data (DOI) read in parallel in the data register 106. For example, the data width of the DOI data may be x8 and the number of DOI data read in parallel may be 4 when the BL signal indicates 4. The DOI data stored in the data register 106 may be continuously (or sequentially) output to the data inversion/non-inversion unit 124.

The first inversion controller 108 may generate a first inversion control signal (INV1) to control whether the DOI data that is continuously input to the data inversion/non-inversion unit 124 is inverted or not when the operating frequency of the semiconductor memory device 100 is less than a reference frequency (for example, 300 MHz) or is a low operating frequency.

The first inversion controller 108 that is used for a low-frequency operation of the semiconductor memory device 100 may generate the INV1 signal in response to a frequency information signal (FI) indicating operating frequency information of the semiconductor memory device 100.

The FI signal may indicate whether the operating frequency of the semiconductor memory device 100 is a high operating frequency (i.e., a frequency greater than or equal to the reference frequency) or the low operating frequency (i.e., a frequency less than the reference frequency). For example, the logic level of the FI signal may be high when the operating frequency is a relatively low operating frequency, and the logic level of the FI signal may be low when the operating frequency is a relatively high operating frequency. The FI signal may be provided by a memory controller (not shown) through the mode register set unit 150 or through a control pad (not shown) of the semiconductor memory device 100.

The second inversion controller 116 may generate a second inversion control signal (INV2) to control whether the DOI data continuously input to the data inversion/non-inversion unit 124 is inverted or not when the operating frequency of the semiconductor memory device 100 is greater than the reference frequency. The second inversion controller 116 that is used for high-frequency operation of the semiconductor memory device 100 may generate the INV2 signal in response to the FI signal.

The data inversion/non-inversion unit 124 may invert or non-invert the bits of the current DOI data that are continuously received from the memory cell array 102 through the data register 106 in response to the INV1 signal and/or the INV2 signal, and may continuously output the inverted or non-inverted DOI data as output data DO.

The INV1 signal of the first inversion controller 108 may control the data inversion/non-inversion unit 124 to invert the current DOI data when the number of inverted bits of the current DOI data as compared with the corresponding bits of the output data DO immediately before the current DOI data (that is, the previous output data DO) is greater than half of the data width of the current DOI data. The INV1 signal may control the data inversion/non-inversion unit 124 to non-invert the current DOI data when the number of inverted bits of the current DOI data as compared with the corresponding bits of the output data DO immediately before the current DOI data is less than or equal to half of the data width of the current DOI data.

The first inversion controller 108 may include a first switch 110, a first comparator 112 and a second comparator 114. The first inversion controller 108 corresponds to a first output driver unit 140 that drives data input/output pads (DQ pads) 144 connected to transmission lines 16 (as illustrated for example, in FIG. 1A according to LVCMOS signaling) and may use a data inversion scheme for LVCMOS signaling. LVCMOS signaling is a transmission line driving method carried out by an output driver of a semiconductor memory device, as described above, for example, with reference to FIG. 1A.

The first switch 110 outputs the current DOI data received from the data register 106 in response to the FI signal. The first comparator 112 compares the bits of the current DOI data output from the first switch 110 with the corresponding bits of the output data DO immediately preceding the current DOI data, counts the number of inverted bits of the current DOI data as compared with the corresponding bits of the previous output data DO immediately preceding the current DOI data, and outputs a first count value corresponding to the counting result.

The second comparator 114 compares the first count value with half of the data width of the current DOI data. The second comparator 114 outputs the INV1 signal having a first logic level (for example, a high level) to control the current DOI data to be inverted when the first count value is greater than half of the data width of the current DOI data. The second comparator 114 outputs INV1 signal having a second logic level (for example, a low level) to control the current DOI data to be non-inverted when the first count value is less than or equal to half of the data width of the current DOI data.

Accordingly, when the semiconductor memory device 100 uses LVCMOS signaling, the first inversion controller 108 may control the number of bits of output data DO, which are inverted (toggled) on transmission line, to be less than or equal to half of the data width of the DOI data to reduce AC power during LVCMOS signaling.

The INV2 signal of the second inversion controller 116 may control the data inversion/non-inversion unit 124 to invert the current DOI data when the number of "1" bits or "0" bits included in the current DOI data is greater than half of the data width of the current DOI data. The INV2 signal controls the data inversion/non-inversion unit 124 to non-invert the current DOI data when the number of "1" bits or "0" bits included in the current DOI data is less than or equal to half of the data width of the current DOI data.

Figure 1B:
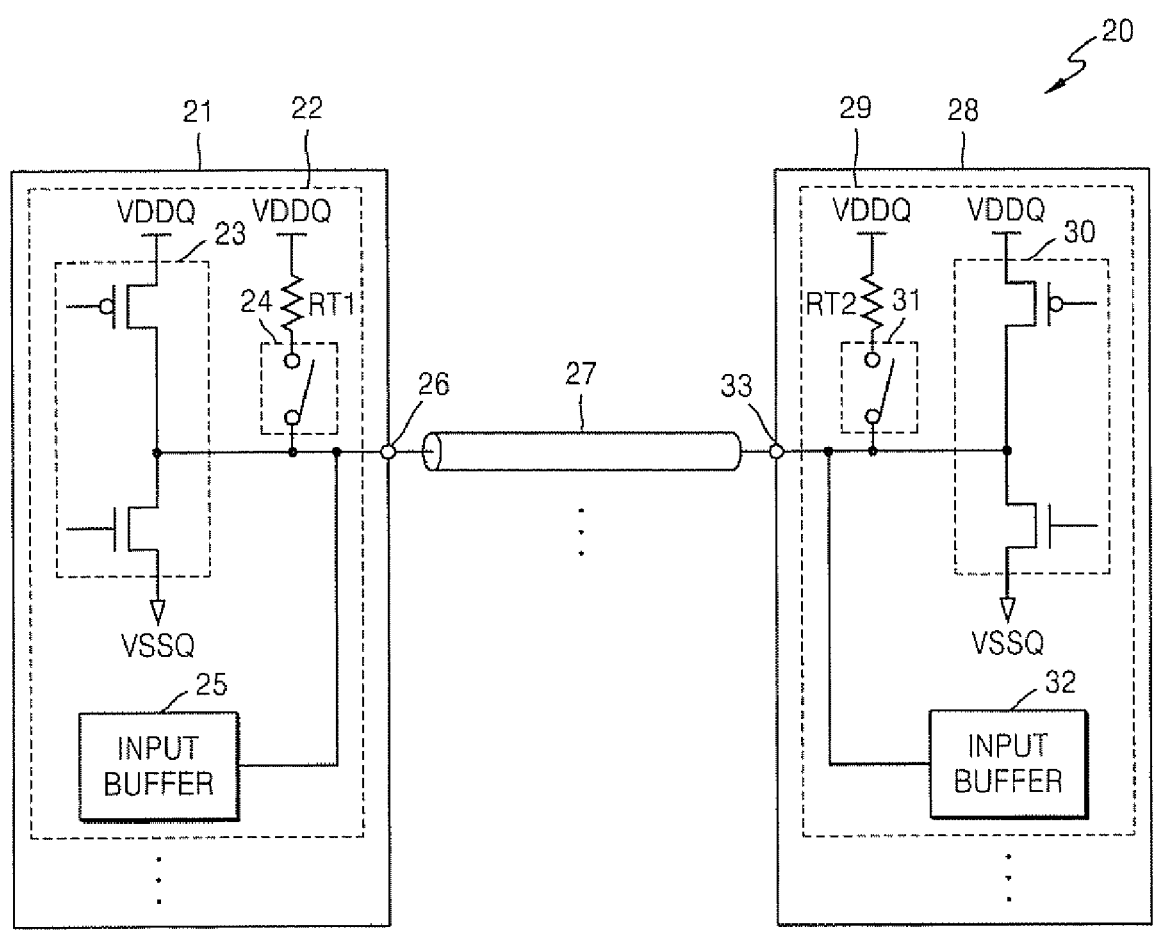
FIG. 1B illustrates a memory system using pseudo open drain (POD) signaling.

The second inversion controller 116 includes a second switch 118, a counter 120 and a third comparator 122. The second inversion controller 116 corresponds to a second output driver unit 142 of the data output unit 134 that drives the DQ pads 144 connected to transmission lines 27 (as illustrated, for example, in FIG. 1B according to POD signaling) and may use a data inversion scheme for POD signaling. POD signaling is a transmission line driving method carried out by an output driver of a semiconductor memory device, as described above, for example, with reference to FIG. 1B.

The second switch 118 may output the current DOI data received from the data register 106 in response to the FI signal. The counter 120 counts the number of "1" bits or "0" bits included in the current DOI data and outputs a second count value corresponding to the counting result. When an output driver (such as the output driver 23 illustrated in FIG. 1B) included in the second output driver unit 142 corresponding to the second inversion controller 116 is an inverter type of driver, the counter 120 may count the number of "1" bits of the current DOI data. When the output driver included in the second output driver unit 142 corresponding to the second inversion controller 116 is a buffer type of driver, the counter 120 may count the number of "0" bits of the current DOI data.

The third comparator 122 may compare the second count value with half of the data width of the current DOI data. The third comparator 122 may output the INV2 signal having a first logic level (for example, a high level) to control the current DOI data to be inverted when the second count value is greater than half of the data width of the current DOI data. The third comparator 122 may output the INV2 signal having a second logic level (for example, a low level) to control the current DOI data to be non-inverted when the second count value is less than or equal to half of the data width of the current DOI data.

Accordingly, when the semiconductor memory device 100 uses POD signaling, the second inversion controller 116 may control the number of "0" bits on the transmission line to be less than or equal to half of the data width of the DOI data to reduce the DC power in POD signaling.

The flag output unit 126 may output a flag signal (FLAG) indicating whether the output data DO is inverted or not to a memory controller (not shown) in response to the INV1 signal or the INV2 signal. For example, the FLAG signal may indicate that the output data DO is inverted when the FLAG signal has a high level (that is, data "1") and may indicate that the output data DO has not been inverted when it has a low level (that is, data "0").

The flag output unit 126 may include a third switch 128, a flag buffer 130 and a flag pad 132. The third switch 128 may output the INV1 signal or the INV2 signal in response to the FI signal. The flag buffer 130 may output the FLAG signal to the flag pad 132 in response to the INV1 signal or the INV2 signal output from the third switch 128.

The data output unit 134 may drive the DQ pads 144 according to LVCMOS signaling based on the output data DO continuously output from the data inversion/non-inversion unit 124 when the operating frequency of the semiconductor memory device 100 is a low operating frequency. The data output unit 134 may drive the DQ pads 144 according to POD signaling based on the output data DO output from the data inversion/non-inversion unit 124 when the operating frequency of the semiconductor memory device 100 is a high operating frequency.

The data output unit 134 may include an output buffer unit 136, a fourth switch 138, the first output driver unit 140, the second output driver unit 142, and the DQ pads 144 connected to the memory controller (not shown) through transmission lines (not shown).

The output buffer unit 136 buffers the output data DO output from the data inversion/non-inversion unit 124 and outputs the buffered data to the fourth switch 138. The data output from the output buffer unit 136 is synchronized with a clock signal (CLK). When the data width of the output data DO output from the data inversion/non-inversion unit 124 is x8, for example, the output buffer unit 136 may include eight output buffers corresponding to the data width of the output data DO.

The fourth switch 138 may selectively output the data output from the output buffer unit 136 to the first output driver unit 140 or to the second output driver unit 142 in response to the FI signal.

The first output driver unit 140 (corresponding to the first inversion controller 108) may receive the output data from the fourth switch 138 and may drive the DQ pads 144 with LVCMOS signaling. The first output driver unit 140 may include an output driver (such as an output driver 13 as illustrated, for example, in FIG. 1A). When the data width of the output data DO is x8, for example, the first output driver unit 140 may correspondingly include eight output drivers (as the output driver 13 illustrated in FIG. 1A).

The second output driver unit 142 (corresponding to the second inversion controller 116) may receive the output data from the fourth switch 138 and may drive the DQ pads 144 with POD signaling. The second output driver unit 142 may include a circuit (such as the output driver 23 and the termination circuit that are illustrated, for example, in FIG. 1B). When the data width of the output data DO is x8, for example, the second output driver unit 142 may correspondingly include eight circuits each including a respective output driver 23 and termination circuit.

Accordingly, the semiconductor memory device 100 may selectively use LVCMOS signaling for low-frequency operation and POD signaling for high-frequency operation.

The input buffer unit 146 may buffer input data DI continuously transmitted from the memory controller and may output the buffered input data to the write circuit 148. When the data width of the input data DI is x8, for example, the input buffer unit 146 may include eight input buffers corresponding to the data width of the input data DI.

The write circuit 148 may include a circuit related to a data write operation of the semiconductor memory device 100 (for example, an input driver). The write circuit 148 may perform a burst write operation that writes input data DI output from the input buffer unit 146 in parallel to the memory cell array 102 in response to a write signal (WRITE). The number of input data DI written in parallel may be 4.

The mode register set 150 may generate the FI signal and the BL signal in response to an address signal (ADDR) provided by the memory controller. The command decoder 152 may generate the READ signal and the WRITE signal synchronized with the CLK signal in response to a command signal (CMD) provided by the memory controller.

As described above, the semiconductor memory device 10 according to some embodiments of the present invention may selectively use LVCMOS signaling for a low-frequency operation and POD signaling for a high-frequency operation. Furthermore, the semiconductor memory device 10 may reduce AC power during LVCMOS signaling using a data inversion scheme suitable for LVCMOS signaling and may decrease DC power during POD signaling using a data inversion scheme suitable for POD signaling.

FIG. 4 is a flow chart illustrating a data inversion method 200 for LVCMOS signaling according to some embodiments of the present invention. The data inversion method 200 will be explained with reference to FIGS. 3 and 4.

The data inversion method 200 for LVCMOS signaling used for a low-frequency operation of the semiconductor memory device 100 may be carried out using the first inversion controller 108, the data inversion/non-inversion unit 124, the flag output unit 126 and the data output unit 134.

In the receiving operation 205, the data inversion/non-inversion unit 124 and the first inversion controller 108 may receive current DOI data from the data register 106. In the first comparison operation 210, the first comparator 112 of the first inversion controller 108 compares the bits of the current DOI data with the corresponding bits of the output data DO immediately preceding the current DOI data, counts the number of inverted bits of the current DOI data as compared with the corresponding bits of the output data DO immediately preceding the current DOI data, and outputs the first count value corresponding to the counting result.

In the second comparison operation 215, the second comparator 114 of the first inversion controller 108 compares the first count value with half of the data width of the current DOI data. When the first count value is less than or equal to half of the data width of the current DOI data, the data inversion method 200 proceeds to the non-inversion operation 220. When the first count value is greater than half of the data width of the current DOI data in the second comparison operation 215, the data inversion method 200 proceeds to the inversion operation 225.

In the non-inversion operation 220, the flag buffer 130 sets the FLAG signal to a data value of '0' to indicate non-inversion of the output data DO, and the data inversion/non-inversion unit 124 non-inverts the current DOI data and outputs the non-inverted data as the output data DO.

In the inversion operation 225, the flag buffer 130 sets the FLAG signal to a data value of '1' to indicate inversion of the output data DO, and the data inversion/non-inversion unit 124 inverts the current DOI data and outputs the inverted data as the output data DO.

In the confirmation operation 230, whether the current DOI data is transmitted from the data register 106 to the data inversion/non-inversion unit 124 and the first inversion controller 108 is confirmed. That is, whether the burst read operation that reads internal output data in parallel from the memory cell array 102 is finished is confirmed.

When it is confirmed that the burst read operation is not finished in the confirmation operation 230, the data inversion method 200 returns to the receiving operation 205. When it is confirmed that the burst read operation is finished in the confirmation operation 230, the data inversion method 200 is completed.

Figure 5A:
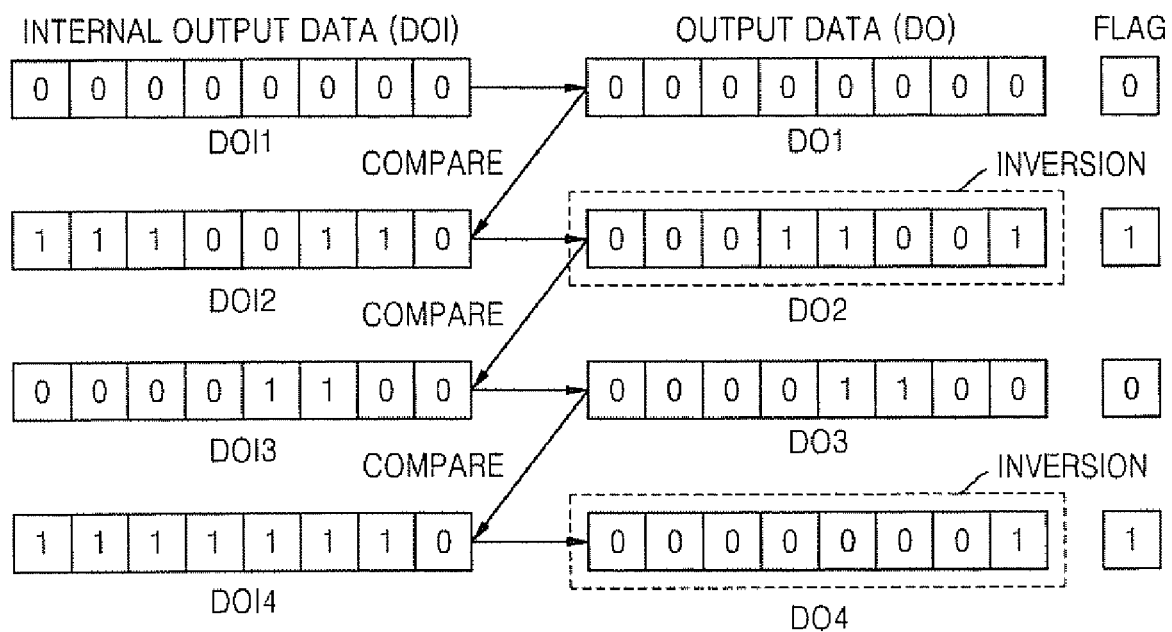
FIG. 5A illustrates output data and flag signals according to data inversion methods illustrated in FIG. 4, according to some embodiments of the present invention.
Figure 5B:
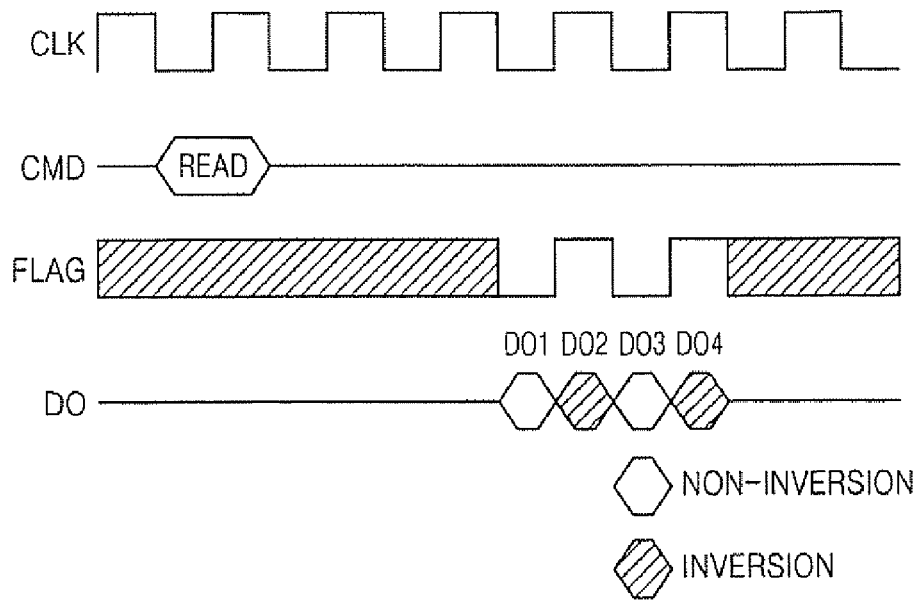
FIG. 5B is a timing diagram of output data and flag signals illustrated in FIG. 5A, according to some embodiments of the present invention.

FIG. 5A illustrates output data DO and the FLAG signal according to the data inversion method illustrated in FIG. 4, and FIG. 5B is a timing diagram of the output data DO and the FLAG signal, according to embodiments of the present invention. FIG. 5A illustrates the output data DO and the FLAG signal when the data width of the DOI data is x8 and the burst length of the DOI data is 4. Referring to FIGS. 3 and 5A, four units of internal output data DOI1, DOI2, DOI3 and DOI4 (each including 8 bits) that are read in parallel from the memory cell array 102 are sequentially output by the data register 106 to the data inversion/non-inversion unit 124.

The first internal output data unit DOI1, "00000000", received by the data inversion/non-inversion unit 124 is compared with the output data DO (not shown) (for example, "00000001") immediately proceding the first internal output data DOI1 bit by bit. Hence, the number of inverted (toggled) bits of the first internal output data DOI1 is compared with the corresponding bits of the previous output data. Since the number of inverted bits of the first internal output data DOI1 relative to the immediately preceding output data (i.e., 1) is less than half of the data width of the DOI data, 4, the first internal output data unit DOI1 is not inverted and "00000000" is output as first output data DO1. The FLAG signal corresponding to the first output data DO1 has a data value of "0" because the first output data DO1 has not been inverted.

The second internal output data DOI2, "11100110", received by the data inversion/non-inversion unit 124 is compared with the first output data DO1, "00000000", immediately preceding the second internal output data DOI2, bit by bit. Hence, the number of inverted bits of the second internal output data DOI2 compared to the corresponding bits of the first output data DO1 is 5. Since the number of inverted bits of the second internal output data DO2 (relative to output data DO1) is greater than half of the data width of the internal output data DOI, 4, the second internal output data DOI2 is inverted so that "00011001" is output as second output data DO2. The FLAG signal corresponding to the second output data DO2 has a data value of "1" because the second internal output data unit DO2 was inverted.

The third internal output data DOI3 and the fourth internal output data DOI4 are inverted or non-inverted according to the same data inversion method as previously described so that repetitive explanations thereof are omitted.

Referring to FIG. 5B, the READ signal that dictates the burst read operation is synchronized with the CLK signal and both may be applied to the semiconductor memory device 100 (illustrated in FIG. 3) such as a double data rate synchronous DRAM from a memory controller. Then, the first to fourth output data DO1, DO2, DO3 and DO4 and the FLAG signals may be continuously output in synchronization with a falling edge and a rising edge of the CLK signal.

Figure 6:
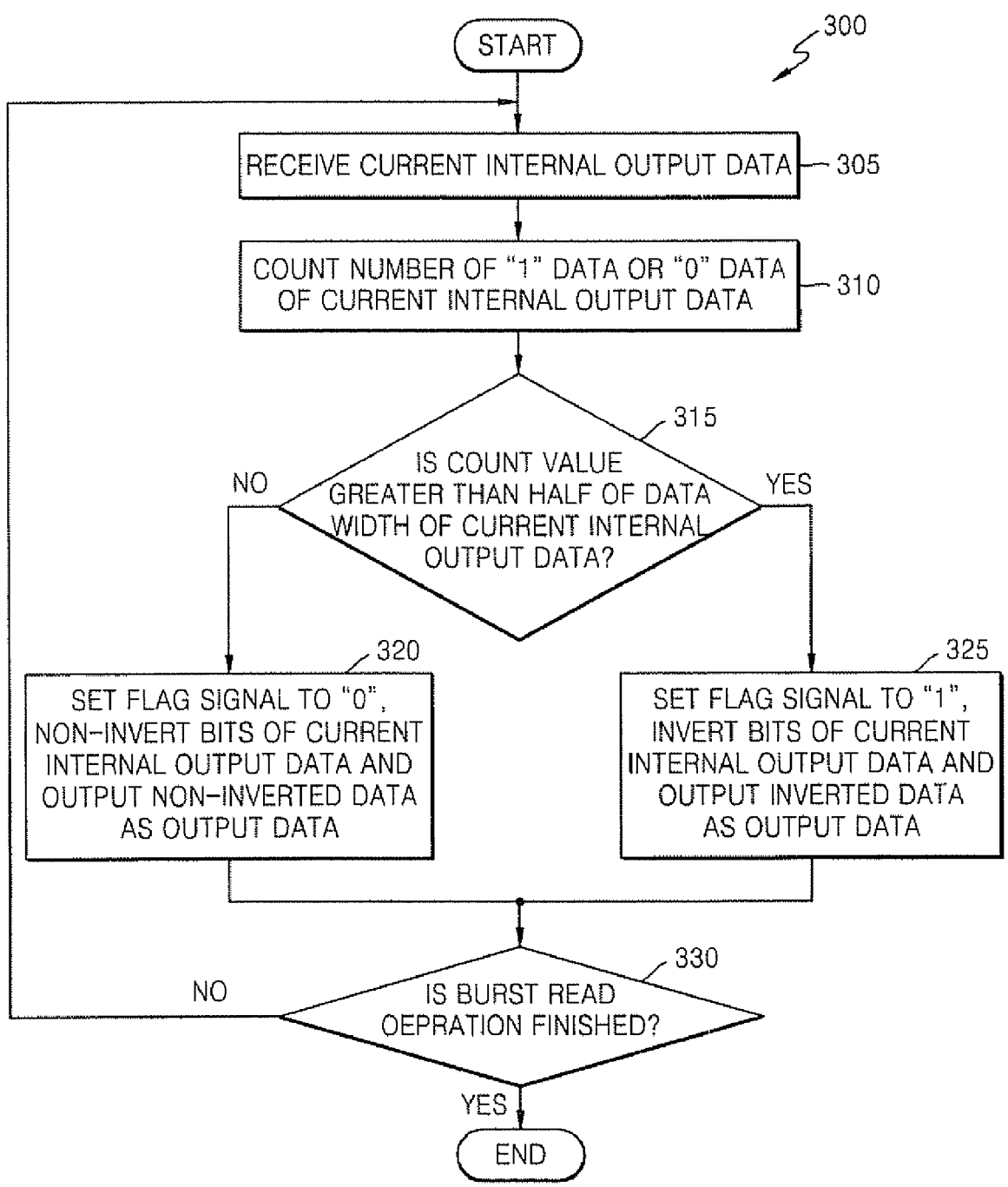
FIG. 6 is a flow chart illustrating data inversion methods for POD signaling according to some embodiments of the present invention.

FIG. 6 is a flow chart of a data inversion method 300 for POD signaling according to embodiments of the present invention. The data inversion method 300 will be explained with reference to FIGS. 3 and 6.

The data inversion method 300 for POD signaling used for a high-frequency operation of the semiconductor memory device 100 may be executed by the second inversion controller 116, the data inversion/non-inversion unit 124, the flag output unit 126 and the data output unit 134.

In the receiving operation 305, the data inversion/non-inversion unit 124 and the second inversion controller 116 receive the current DOI data from the data register 106. In the counting operation 310, the counter 120 of the second inversion controller 116 counts the number of data bits having a value "1" or the number of data bits having a value "0" included in the current DOI data and outputs the second count value corresponding to the counting result.

In the comparison operation 315, the third comparator 122 of the second inversion controller 116 compares the second count value with half of the data width of the current DOI data. When the second count value is less than or equal to half of the data width of the current DOI data, the data inversion method 300 proceeds to the non-inversion operation 320. When the second count value is greater than half of the data width of the current DOI data in the comparison operation 315, the data inversion method 300 proceeds to the inversion operation 325.

In the non-inversion operation 320, the flag buffer 130 sets the FLAG signal to a data value of '0' that indicates a non-inversion of the output data DO, and the data inversion/non-inversion unit 124 non-inverts the current DOI data and outputs the non-inverted data as the output data DO.

In the inversion operation 325, the flag buffer 130 sets the FLAG signal to a data value of '1' that indicates an inversion of the output data DO, and the data inversion/non-inversion unit 124 inverts the current DOI data and outputs the inverted data as the output data DO.

In the confirmation operation 330, whether the current DOI data are transmitted from the data register 106 to the data inversion/non-inversion unit 124 and the second inversion controller 116 is confirmed. That is, whether the burst read operation that reads internal output data in parallel from the memory cell array 102 is finished is confirmed.

When it is confirmed that the burst read operation is not finished in confirmation operation 330, the data inversion method 300 returns to the receiving operation 305. When it is confirmed that the burst read operation is finished in the confirmation operation 330, the data inversion method 300 is completed.

Figure 7A:
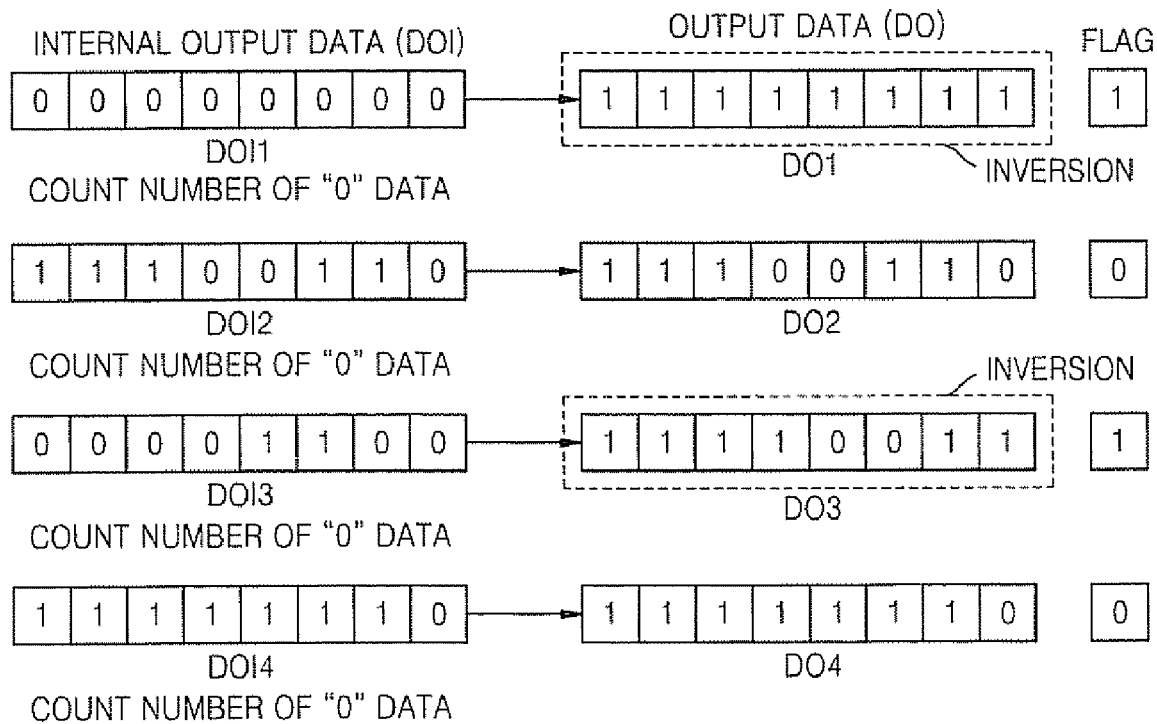
FIG. 7A illustrates output data and flag signals according to data inversion methods illustrated in FIG. 6 according to some embodiments of the present invention.
Figure 7B:
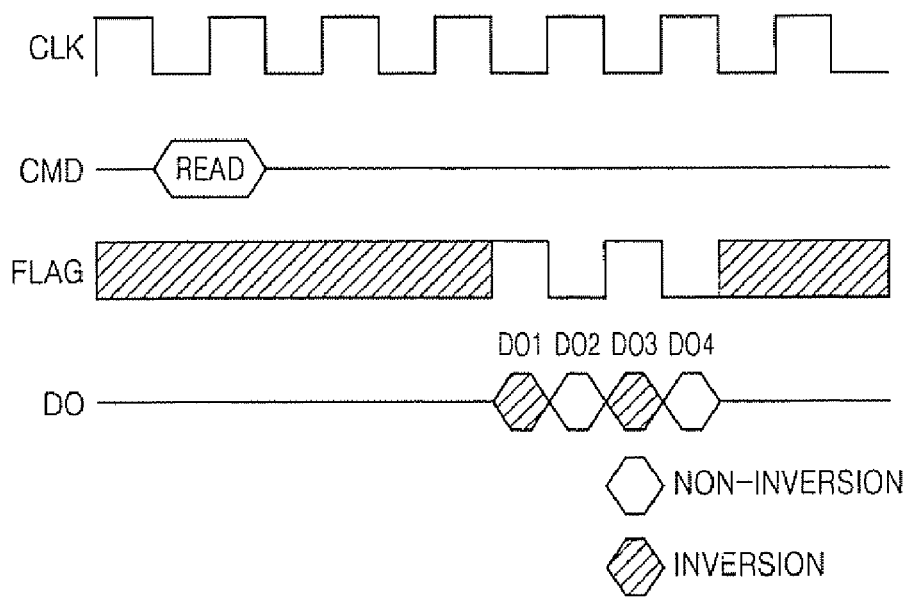
FIG. 7B is a timing diagram of output data and flag signals illustrated in FIG. 7A according to some embodiments of the present invention.

FIG. 7A illustrates the output data DO and the FLAG signal according to the data inversion method 300 illustrated in FIG. 6, and FIG. 7B is a timing diagram of the output data DO and the FLAG signal, according to embodiments of the present invention. FIG. 7A illustrates the output data DO and the FLAG signal when the data width of the DOI data units is x8 and the burst length of the DOI data is 4. Referring to FIGS. 3 and 7A, four internal output data units DOI1, DOI2, DOI3 and DOI4 that are read in parallel from the memory cell array 102 are sequentially output by the data register 106 to the data inversion/non-inversion unit 124.

The number of "0" bits of the first internal output data unit DOI1, "00000000", received by the data inversion/non-inversion unit 124 is counted. Hence, the number of "0" bits of the first internal output data DOI1 is 8. Since the number of "0" bits of the first internal output data unit DOI1 is greater than half of the data width of the DOI data, 4, the first internal output data DOI1 is inverted and "11111111" is output as first output data DO1. The FLAG signal corresponding to the first output data DO1 has a data value of "1" because the first output data DO1 is inverted.

The number of "0" bits of the second internal output data DOI2, "11100110", received by the data inversion/non-inversion unit 124 is counted. Hence, the number of "0" bits of the second internal output data DOI2 is 3. Since the number of "0" bits of the second internal output data DOI2 is less than half of the data width of the DOI data, 4, the second internal output data DOI2 is not inverted and "11100110" is output as second output data DO2. The FLAG signal corresponding to the second output data DO2 has a data value of "0" because the second output data DO2 is not inverted.

The third internal output data DOI3 and the fourth internal output data DOI4 are inverted or non-inverted according to the same data inversion method as described above so that explanations thereof are omitted.

Referring to FIG. 7B, the READ signal that dictates the burst read operation is synchronized with the CLK signal and both may be applied to the semiconductor memory device 100 (illustrated in FIG. 3) such as a double data rate synchronous DRAM. Then, the first to fourth output data DO1, DO2, DO3 and DO4 and the FLAG signals are continuously output in synchronization with falling and/or rising edges of the CLK signal.

Figure 8:
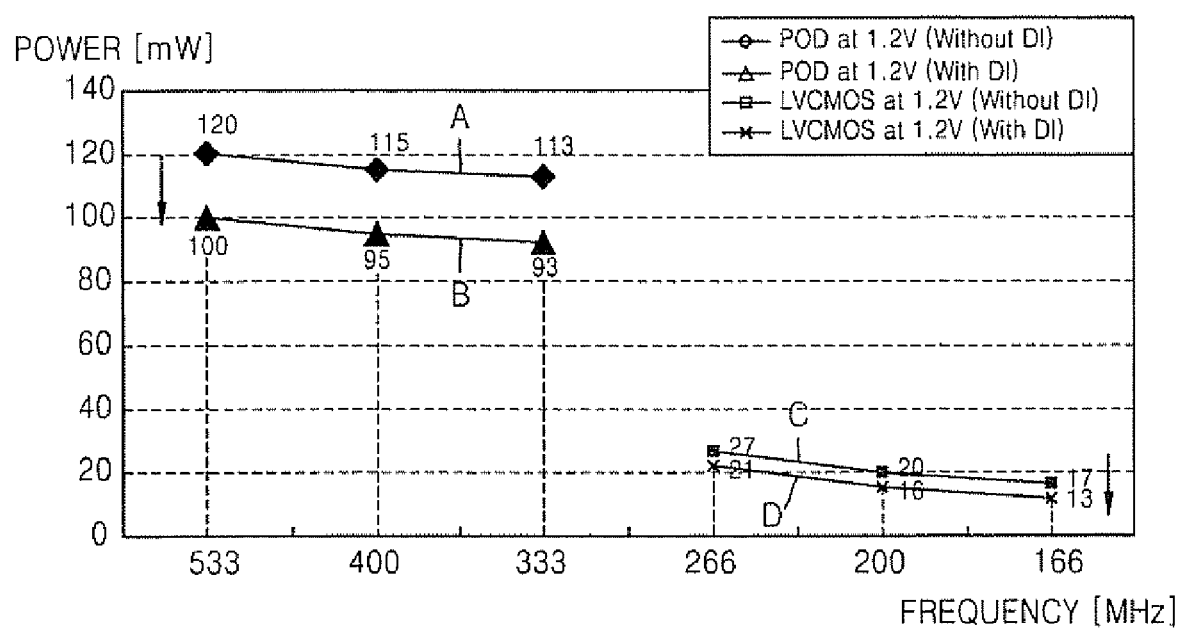
FIG. 8 is a graph illustrating a reduction in power consumed by POD signaling using data inversion methods illustrated in FIG. 6 and a reduction in power consumed by LVCMOS signaling using data inversion methods illustrated in FIG. 4, according to some embodiments of the present invention.

FIG. 8 is a graph illustrating reductions in power consumed during POD signaling using the data inversion method 300 illustrated in FIG. 6 and reductions in power consumed during LVCMOS signaling using the data inversion method 200 illustrated in FIG. 4, according to some embodiments of the present invention.

Referring to FIG. 8, line "A" indicates power consumed as a function of operating frequency during POD signaling using a no data inversion method, and line "B" indicates power consumed as a function of operating frequency during POD signaling using the data inversion method 300 according to embodiments of the present invention. In addition, line "C" indicates power consumed as a function of operating frequency during LVCMOS signaling using a no data inversion method, and line "D" indicates power consumed as a function of operating frequency during POD signaling using the data inversion method 200 according to embodiments of the present invention. In FIG. 8, consumed power is average power when data is transmitted through 32 DQ pads at the power supply voltage VDDQ of 1.2V.

Referring to lines "A" and "B", it can be seen that POD signaling using the data inversion method 300 according to embodiments of the present invention may reduce consumed power by approximately 18% as compared with POD signaling without using the data inversion method, and LCVMOS signaling using the data inversion method 200 according to embodiments of the present invention may reduce consumed power by approximately 22% as compared with LVCMOS signaling without using the data inversion method.

Figure 9:
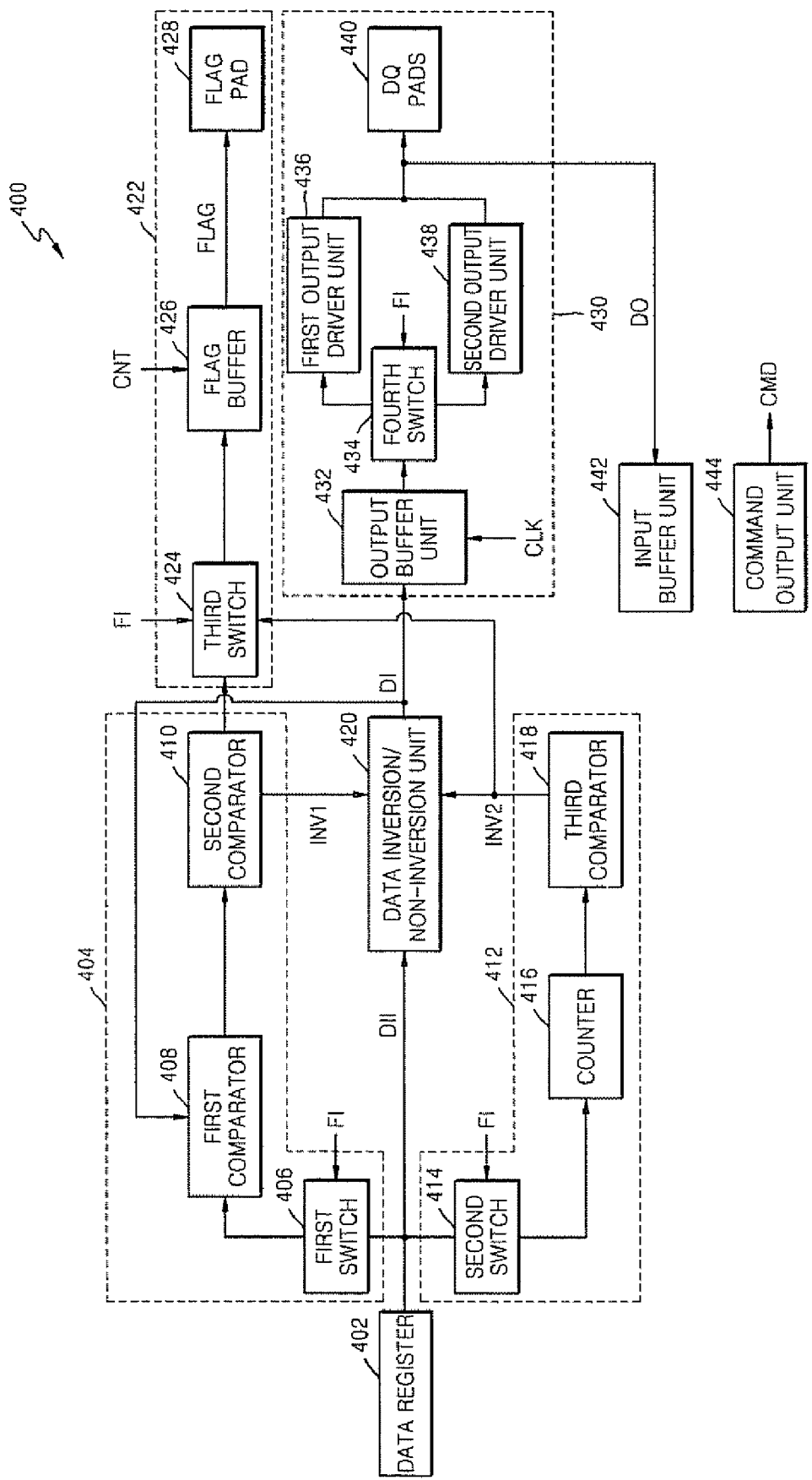
FIG. 9 is a block diagram of a memory controller according to some embodiments of the present invention.

FIG. 9 is a block diagram illustrating a memory controller 400 according to some additional embodiment is of the present invention. Referring to FIG. 9, the memory controller 400 includes a data register 402, a first inversion controller 404, a second inversion controller 412, a data inversion/non-inversion unit 420, a flag output unit 422, a data output unit 430, an input buffer unit 442, and a command output unit 444. The memory controller 400 may control data write and/or data read operations of a semiconductor memory device, such as the semiconductor memory device 100 of FIG. 3.

The first inversion controller 404 may include a first switch 406, a first comparator 408 and a second comparator 410. The second inversion controller 412 may include a second switch 414, a counter 416 and a third comparator 418.

The flag output unit 422 may include a third switch 424, a flag buffer 426 and a flag pad 428 connected to the semiconductor memory device (not shown) through a transmission line (not shown). The data output unit 430 may include an output buffer unit 432, a fourth switch 434, a first output driver unit 436, a second output driver unit 438, and DQ pads 440 connected to the semiconductor memory device through transmission lines.

The first inversion controller 404, the second inversion controller 412, the flag output unit 422 and the data output unit 430 may be substantially identical to the first inversion controller 108, the second inversion controller 116, the flag output unit 126 and the data output unit 134 respectively illustrated in FIG. 3 so that explanations thereof are omitted. The first inversion controller 404, the second inversion controller 412, the flag output unit 422 and the data output unit 430 may operate in response to an FI signal that indicates operating frequency information of the memory controller 400. The FI signal may be provided by a central processing unit external to the memory controller 40.

Furthermore, operations of the data inversion/non-inversion unit 420 (controlled by the first inversion controller 404 and the second inversion controller 412) and the data register 402, which continuously outputs internal input data DII to the data inversion/non-inversion unit 420 may be substantially identical to those of the data inversion/non-inversion unit 124 and the data register 106 respectively illustrated in FIG. 3 so that explanations thereof are omitted. However, data output from the data inversion/non-inversion unit 420 may be input data DI for data write operations of the semiconductor memory device while data output from the data inversion/non-inversion unit 124 illustrated in FIG. 3 may be output data DO for data read operations of the semiconductor memory device. Furthermore, the internal input data DII stored in the data register 402 may be provided by the central processing unit while the internal output data DOI stored in the data register 106 illustrated in FIG. 3 may be provided by the memory cell array 102.

The input buffer unit 442 may buffer output data DO continuously transmitted from the semiconductor memory device. The buffered output data DO may be used in a circuit block included in the memory controller 400 or input to an external cache memory or the central processing unit. When the data width of the output data DO is x8, for example, the input buffer unit 442 may include eight input buffers corresponding to the data width of the output data DO.

The command output unit 444 provides the command signal (CMD) to the semiconductor memory device in response to a signal input from the central processing unit.

The memory controller 400 according to some embodiments of the present invention may selectively use LVCMOS signaling for low-frequency operations and POD signaling for high-frequency operations when transmitting input data for write operations to the semiconductor memory device. Furthermore, the memory controller 400 may reduce AC power in LVCMOS signaling using a data inversion method suitable for LVCMOS signaling and may reduce DC power in POD signaling using a data inversion method suitable for POD signaling.

Figure 10:
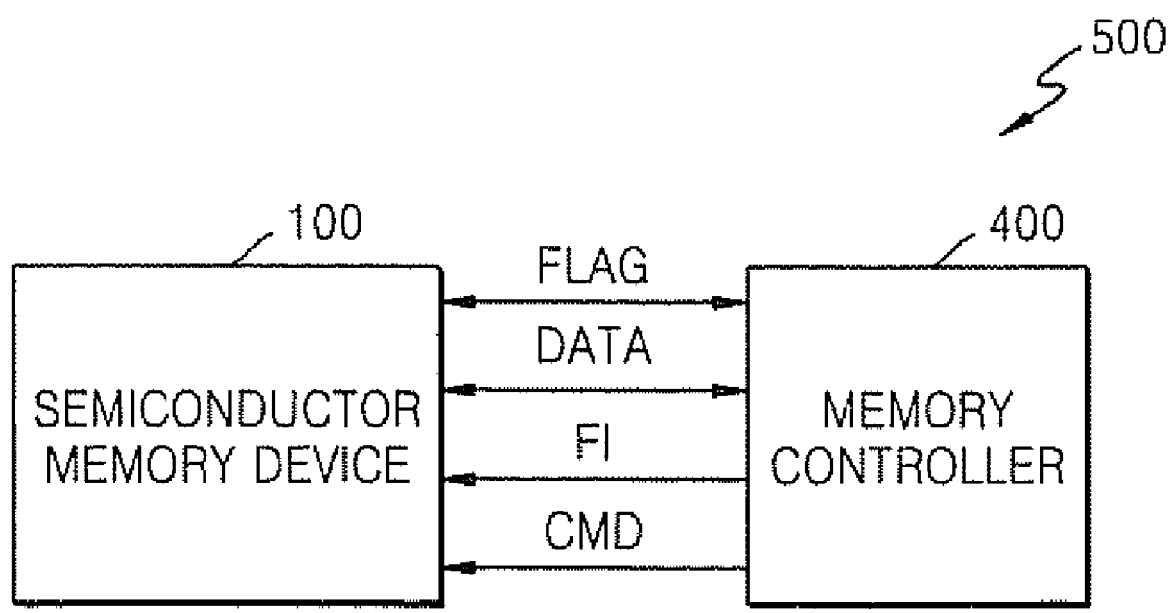
FIG. 10 is a block diagram of a memory system according to some embodiments of the present invention.

FIG. 10 is a block diagram of a memory system 500 according to some embodiments of the present invention. The memory system 500 may include the semiconductor memory device 100 illustrated in FIG. 3 and the memory controller 400 illustrated in FIG. 9.

The memory controller 400 may provide the CMD signal and the FI signal to the semiconductor memory device 100. The semiconductor memory device 100 may operate in response to the FI signal that indicates whether the operating frequency of the memory system 500 is greater than or less than the reference frequency, that is, whether the operating frequency of the memory system 500 is a relatively high operating frequency or a relatively low operating frequency. The memory controller 400 may operate in response to the FI signal.

The data read operation of the semiconductor memory device 100 will be explained. When the operating frequency of the memory system 500 is a relatively low operating frequency, the semiconductor memory device 100 may invert current internal output data continuously read from the memory cell array 102 illustrated in FIG. 3 and may output the inverted data as output data (DATA) when the number of inverted bits of the current internal output data as compared with the corresponding bits of output data immediately preceding the current internal output data is greater than half of the data width of the current internal output data. In addition, the semiconductor memory device 100 may transmit the output DATA to the memory controller 400 through data buses corresponding to transmission lines using LVCMOS signaling and, simultaneously, may transmit the FLAG signal indicating inversion of the output DATA to the memory controller 400.

When the operating frequency of the memory system 500 is a relatively high operating frequency, the semiconductor memory device 100 may invert the current internal output data and may output the inverted data as the output DATA when the number of "1" bits or "0" bits of the current internal output data is greater than half of the data width of the current internal output data. In addition, the semiconductor memory device 100 may transmit the output DATA to the memory controller 400 through the data buses using POD signaling and, simultaneously, may transmit the FLAG signal indicating inversion of the output DATA to the memory controller 400.

Data write operations of the semiconductor memory device 100 will be explained.

When the operating frequency of the memory system 500 is a relatively low operating frequency, the memory controller 400 may invert current internal input data continuously read from the data register 402 illustrated in FIG. 9 and may output the inverted data as input data (DATA) when the number of inverted bits of the current internal input data compared with the corresponding bits of output data right before the current internal output data is greater than half of the data width of the current internal input data. In addition, the memory controller 400 may transmit the input DATA to the semiconductor memory device 100 through the data buses using LVCMOS signaling and, simultaneously, may transmit the FLAG signal indicating inversion of the input DATA to the semiconductor memory device 100.

When the operating frequency of the memory system 500 is a relatively high operating frequency, the memory controller 400 may invert the current internal input data and may output the inverted data as the input DATA when the number of "1" bits or "0" bits of the current internal input data is greater than half of the data width of the current internal input data. In addition, the memory controller 400 may transmit the input DATA to the semiconductor memory device 100 through the data buses using POD signaling and, simultaneously, may transmit the FLAG signal indicating inversion of the input DATA to the semiconductor memory device 100.

Memory systems according to embodiments of the present invention may selectively use LVCMOS signaling suitable for low-frequency operation and POD signaling suitable for high-frequency operation. Furthermore, memory systems according to embodiments of the present invention may reduce AC power during LVCMOS signaling using a data inversion method suitable for LVCMOS signaling and may reduce DC power during POD signaling using a data inversion method suitable for POD signaling.

In the drawings and specification, there have been disclosed embodiments of the invention, and, although specific terms are employed, they are used in a generic and descriptive sense only and not for purposes of limitation, the scope of the invention being set forth in the following claims.

What is claimed is:

1. A method of communicating a plurality of groups of output data bits representing a respective plurality of groups of input data bits over a data bus wherein each group of output data bits and each group of input data bits have an equal data width, the method comprising:
receiving each of a first plurality of groups of input data bits at a data register to be transmitted at a first data rate;
for each group of input data bits of the first plurality received at the data register, if a number of data bits of the group of input data bits having a first logic level is greater than half of the data width,
inverting the group of input data bits,
transmitting the inverted group of input data bits as a respective group of output data bits in parallel over the data bus at the first data rate, and
transmitting an inversion flag associated with the respective group of output data bits; and
for each group of input data bits received at the data register, if a number of data bits of the group of input data bits having a second logic level different than the first logic level is greater than half of the data width,
transmitting the group of input data bits without inversion as a respective group of output data bits in parallel over the data bus at the first data rate, and
transmitting a non-inversion flag associated with the respective group of output data bits;
receiving each of a second plurality of groups of input data bits at the data register to be transmitted at a second data rate different than the first data rate;
for each group of input data bits of the second plurality received at the data register, if a number of data bits of the group of input data bits that changes with respect to respective data bits of a preceding group of output data bits transmitted at the second data rate is greater than half of the data width,
inverting the group of input data bits,
transmitting the inverted group of input data bits as a respective group of output data bits in parallel over the data bus at the second data rate, and
transmitting an inversion flag associated with the respective group of output data bits; and
for each group of input data bits of the second plurality received at the data register, if a number of data bits of the group of input data bits that remains unchanged with respect to respective data bits of a preceding group of output data bits transmitted at the second data rate is greater than half of the data width,
transmitting the group of input data bits without inversion as a respective group of output data bits in parallel over the data bus at the second data rate, and
transmitting a non-inversion flag associated with the respective group of output data bits.

2. A method according to claim 1 wherein the data bus includes a plurality of data transmission lines, wherein transmitting the respective groups of output data bits comprises transmitting data bits of each respective group of output data bits over respective ones of the data transmission lines.

3. A method according to claim 2, the method further comprising:
coupling each of the data transmission lines through a respective switch and a respective termination resistor to a reference voltage when transmitting the respective groups of output data bits.

4. A method according to claim 3 wherein the reference voltage is a power supply voltage.

5. A method according to claim 1 wherein receiving each of the plurality of groups of input data bits comprises sequentially receiving each of the plurality of groups of input data bits at the data register.

6. A method according to claim 1 wherein the first logic level is a low voltage logic level and wherein the second logic level is a high voltage logic level greater than the low voltage logic level.

7. A method according to claim 1 wherein the inversion and non-inversion flags are transmitted over the data bus in parallel with the associated groups of output data bits.

8. A method according to claim 1 wherein receiving each of the plurality of groups of input data bits comprises receiving each of the plurality of groups of input data bits from a memory cell array of an integrated circuit memory device during a read operation, wherein transmitting the respective groups of output data bits comprises transmitting the respective groups of output data bits from the integrated circuit memory device over the data bus to a memory controller.

9. A method according to claim 8 further comprising:
receiving the groups of output data bits and the inversion and non-inversion flags at the memory controller.

10. A method according to claim 1 wherein the data register comprises a data register of a memory controller, and wherein transmitting the respective groups of output data bits comprises transmitting the respective groups of output data bits from the memory controller over the data bus to an integrated circuit memory device during a write operation to write the respective groups of input data bits to a memory cell array of the integrated circuit memory device.

11. A method according to claim 10 further comprising:
receiving the groups of output data bits and the inversion and non-inversion flags at the integrated circuit memory device.

12. A method according to claim 1 wherein the first data rate is greater than the second data rate.

13. An electronic data system comprising:
a data register configured to receive each of a first plurality of groups of input data bits to be transmitted at a first data rate and to receive each of a second plurality of groups of input data bits;
an inversion controller coupled to the data register, wherein for each group of input data bits of the first plurality received at the data register, if a number of data bits of the group of input data bits having a first logic level is greater than half of the data width the inversion controller is configured to invert the group of input data bits to generate a respective group of output data bits, wherein for each group of input data bits of the first plurality received at the data register, if a number of data bits of the group of input data bits having a second logic level different than the first logic level is greater than half of the data width, the inversion controller is configured to generate a respective group of output data bits without inversion, wherein for each group of input data bits of the second plurality received at the data register, if a number of data bits of the group of input data bits that changes with respect to respective data bits of a preceding group of output data bits is lower than half of the data width, the inversion controller is configured to invert the group of input data bits to generate a respective group of output data bits, and wherein for each group of input data bits of the second plurality received at the data register, if a number of data bits of the group of input data bits that remains unchanged with respect to respective bits of a preceding group of output data bits is greater than half of the data width, the inversion controller is configured to generate a respective group of output data bits without inversion;

an output driver coupled to the inversion controller wherein the output driver is configured to transmit each respective group of output data bits corresponding to respective ones of the groups of input data bits of the first plurality in parallel over a data bus at the first data rate, and wherein the output driver is configured to transmit each respective group of output data bits corresponding to respective ones of the groups of input data bits of the second a second data rate different than the first data rate at the second data rate; and a flag output generator coupled to the inversion controller, wherein the flag output generator is configured to transmit an inversion flag with each group of output data bits generated by inverting the respective group of input data bits, and wherein the flag output generator is configured to transmit a non-inversion flag with each group of output data bits generated without inverting the respective group of input data bits.

14. An electronic data system according to claim 13 wherein the data bus includes a plurality of data transmission lines, wherein transmitting the respective groups of output data bits comprises transmitting data bits of each respective group of output data bits over respective ones of the data transmission lines.

15. An electronic data system according to claim 14 further comprising:
respective termination circuits coupled to each of the data transmission lines, wherein each termination circuit includes a switch and a termination resistor coupled in series between a reference voltage and the respective data transmission line.

16. An electronic data system according to claim 15 wherein the reference voltage is a power supply voltage.

17. An electronic data system according to claim 13 wherein the data register is configured to sequentially receive each of the plurality of groups of input data bits.

18. An electronic data system according to claim 13 wherein the first logic level is a low voltage logic level and wherein the second logic level is a high voltage logic level greater than the low voltage logic level.

19. An electronic data system according to claim 13 wherein the flag output generator is configured to transmit the inversion and non-inversion flags over the data bus in parallel with the associated groups of output data bits.

20. An electronic data system according to claim 13 wherein the data register is configured to receive each of the plurality of groups of input data bits from an integrated circuit memory cell array during a read operation, the electronic data system further comprising:
a memory controller coupled to the data bus, wherein the memory controller is configured to receive the groups of output data bits and the inversion and non-inversion flags over the data bus.

21. An electronic data system according to claim 13 wherein the data register comprises a data register of a memory controller, the electronic data system further comprising:
an integrated circuit memory device coupled to the data bus, the integrated circuit memory device being configured to receive the groups of output data bits and the inversion and non-inversion flags at the integrated circuit memory device and to write the respective groups of input data bits to a memory cell array of the integrated circuit memory device.

22. A method of communicating a plurality of groups of output data bits representing a respective plurality of groups of input data bits over a data bus wherein each group of output data bits and each group of input data bits have an equal data width, the method comprising:
receiving each of a first plurality of groups of input data bits at a data register to be transmitted at a first data rate;
for each group of input data bits of the first plurality received at the data register, transmitting a respective group of output data bits in parallel over the data bus at the first data rate;
receiving each of a second plurality of groups of input data bits at the data register to be transmitted at a second data rate different than the first data rate;
for each group of input data bits of the second plurality received at the data register, if a number of data bits of the group of input data bits that changes with respect to respective data bits of a preceding group of output data bits transmitted at the second data rate is greater than half of the data width,
inverting the group of input data bits,
transmitting the inverted group of input data bits as a respective group of output data bits in parallel over the data bus at the second data rate, and
transmitting an inversion flag associated with the respective group of output data bits; and
for each group of input data bits of the second plurality received at the data register, if a number of data bits of the group of input data bits that remains unchanged with respect to respective data bits of a preceding group of output data bits transmitted at the second data rate is greater than half of the data width,
transmitting the group of input data bits without inversion as a respective group of output data bits in parallel over the data bus at the second data rate, and
transmitting a non-inversion flag associated with the respective group of output data bits.

23. A method according to claim 22 wherein the first data rate is greater than the second data rate.

24. A method of transmitting data from an integrated circuit memory device, the method comprising:
generating a first inversion control signal when the operating frequency of the integrated circuit memory device is less than a reference frequency, or generating a second inversion control signal when the operating frequency is greater than or equal to reference frequency;
inverting the bits of first output data in response to the first inversion control signal when the number of inverted bits of the first output data as compared with the corresponding bits of a second output data immediately preceding the first output data is greater than half of a data width of the first output data, or inverting the bits of the first output data in response to the second inversion control signal when the number of "1" bits or "0" bits of the first output data is greater than half of the data width of the first output data; and
outputting the first output data with a flag signal indicating whether the first output data is inverted or not in response to the first inversion control signal or the second inversion control signal.

* * * * *